United States Patent
Orlamünder

(12) 
(10) Patent No.: US 6,464,058 B2
(45) Date of Patent: Oct. 15, 2002

(54) HUB FOR A CLUTCH

(75) Inventor: Andreas Orlamünder, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/492,902

(22) Filed: Jan. 27, 2000

(65) Prior Publication Data

US 2002/0053498 A1 May 9, 2002

(30) Foreign Application Priority Data

Feb. 3, 1999 (DE) ......................... 199 04 134

(51) Int. Cl.[7] .............................. F16D 13/64
(52) U.S. Cl. .................. 192/70.2; 74/449; 192/212
(58) Field of Search ............ 192/70.17, 70.19, 192/70.2, 212; 74/449, 446, 451; 29/893.33, 893.32, 893.3

(56) References Cited

U.S. PATENT DOCUMENTS

| 988,106 A | * | 3/1911 | Johnston .................... 29/893.3 |
| 1,536,588 A | | 5/1925 | Judd |
| RE22,635 E | * | 4/1945 | Thelander ............... 192/212 X |
| 4,013,153 A | * | 3/1977 | Morino et al. ......... 192/53.343 |
| 4,131,032 A | * | 12/1978 | Warland et al. .............. 74/449 |
| 4,190,142 A | * | 2/1980 | Berlioux ................ 192/214.1 |
| 4,352,420 A | * | 10/1982 | Maycock ................ 192/214.1 |
| 4,945,782 A | * | 8/1990 | Farrell ................ 192/70.2 X |
| 5,062,513 A | * | 11/1991 | Grosspietsch et al. ... 192/70.17 |
| 5,226,517 A | * | 7/1993 | Grochowski ........... 192/70.2 X |
| 5,904,231 A | * | 5/1999 | Arhab et al. .............. 192/3.29 |
| 6,070,708 A | * | 6/2000 | Fukuda et al. ........... 192/70.21 |

FOREIGN PATENT DOCUMENTS

| DE | 2 027 653 | 12/1971 | |
| DE | 39 03 652 | 8/1990 | ........... F16D/13/64 |
| DE | 195 30 443 | 10/1996 | ........... F16D/11/14 |
| GB | 2 203 217 | 10/1988 | ............ F16D/3/14 |
| GB | 2 216 233 | * 10/1989 | .............. 192/70.17 |
| JP | 5-149347 | * 6/1993 | ................ 192/70.2 |
| JP | 6-17840 | * 1/1994 | ................ 192/70.2 |

* cited by examiner

Primary Examiner—Rodney H. Bonck
(74) Attorney, Agent, or Firm—Cohen, Pontani, Lieberman & Pavane

(57) ABSTRACT

A hub for a motor vehicle clutch includes a driver and a ring element arranged on the driver and constructed as a sheet metal part with a profile that receives torque to be conducted into a driven shaft by friction facings via the driver. The driver is also made from a sheet metal part. A radial outer area of the driver has a shape corresponding to the ring element. The hub has a low weight and is produced economically.

16 Claims, 4 Drawing Sheets

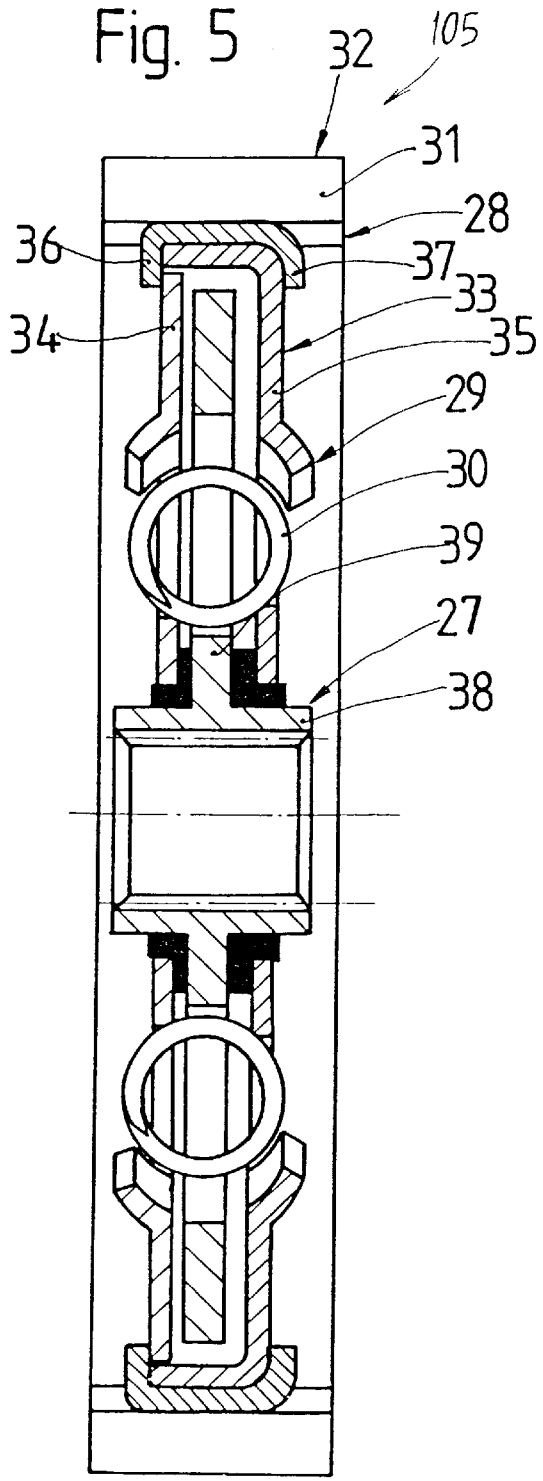
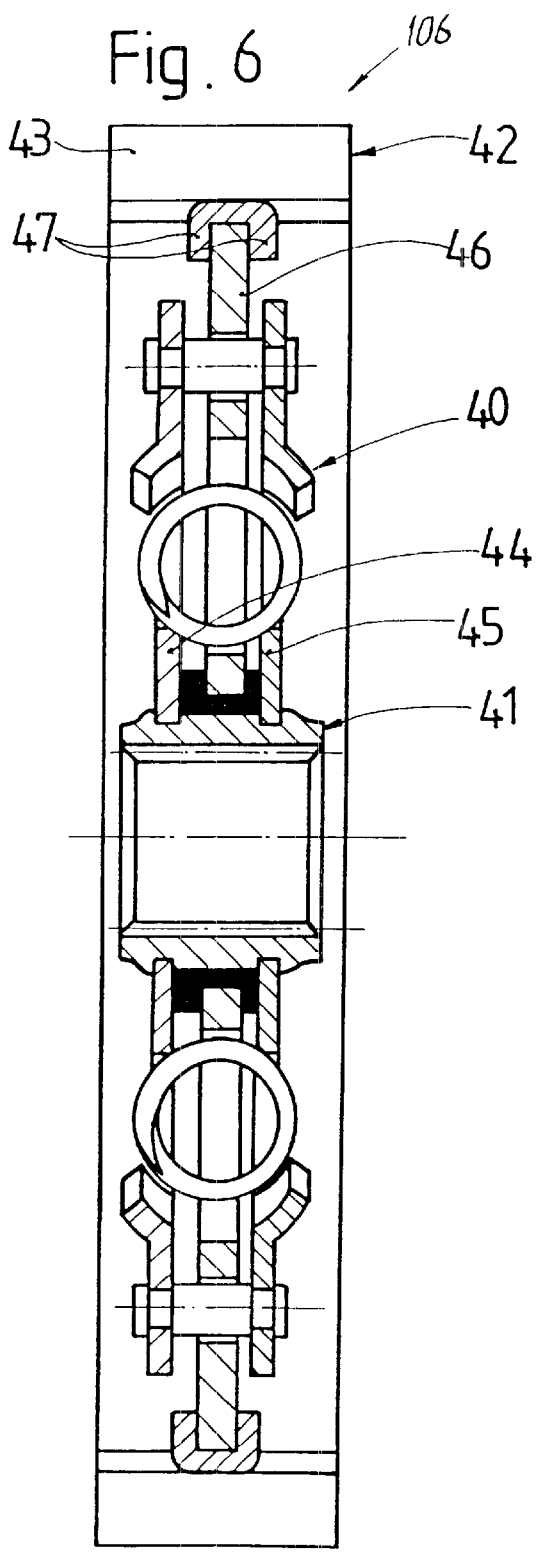

HUB FOR A CLUTCH

BACKGROUND OF THE INVENTION

1. Field of the Invention

The present invention is directed to a hub for a motor vehicle clutch with a driver connectable to a shaft and a ring element arranged on a circumference of the driver, wherein the ring element has a profile for receiving torque conducted into the shaft from friction facings arranged on the ring element.

2. Description of the Related Art

Hubs for motor vehicle clutches that have drivers arranged on shafts and ring elements arranged on the drivers are known and are used in multidisk clutches to hold friction facings on an input shaft of a transmission so that the friction facings are fixed with respect to rotation and axially displaceable relative to the input shaft. The prior art hub is usually forged and subsequently machined by cutting in its radial inner and outer areas. The profile of the prior art hub typically has a splined shaft profile and serves to hold the friction facings directly or to hold facing springs connected with the friction facings.

A disadvantage of the prior art hub is that the manufacture by cutting is cost-intensive. Further, because of its construction, the prior art hub has a high material requirement and is very heavy. The heavy weight leads to unwanted inertia in the assembled state during acceleration of the hub.

SUMMARY OF THE INVENTION

The object of the invention is to provide a hub for a transmission input shaft in a motor vehicle clutch that is inexpensive to produce and has the lowest possible weight.

The object is met according to an embodiment of the present invention in that the hub element has a ring element comprising a circumferential sheet metal part which is shaped to a required profile.

The hub according to the present invention may be constructed with very thin walls because the ring element is manufactured as a sheet metal part. The hub accordingly has a particularly low weight in its radial outer area and therefore has an especially low inertia in its mounted state. Since the profile of the ring element for receiving the friction facings is formed by shaped portions of the sheet metal part, the present invention eliminates the costly requirement for subsequent machining of the profile by cutting. Therefore, the hub according to the present invention is manufactured particularly economically. A further advantage of the inventive design is that the surface of the profile has a particularly high-resistance to wear because of the cold hardening resulting from the shaping of the sheet metal part.

The sheet metal part of the ring element may be mounted, for example, directly on a forged driver part that is fastenable to the shaft. However, this forged part would be very heavy. To further reduce the weight of the hub, the driver according to the present invention has a sheet metal part with a tubular collar provided for enclosing the shaft and a rim arranged perpendicular to the collar. Furthermore, the collar may often be manufactured with very great accuracy by the deep-drawing method. Therefore, subsequent machining of the area of the driver contacting the shaft is not necessary This facilitates a further reduction in the manufacturing costs of the hub according to the present invention.

The hub may be manufactured, for example, in one piece from a sheet metal shaped by a deep-drawing method. However, the hub resulting from this manufacturing method is limited to having simple shapes which results in a very limited stability of the hub and in an asymmetric introduction of force into the hub. Instead of manufacturing the hub from one sheet metal piece, the driver manufactured from one sheet metal part and the ring element manufactured from another sheet metal part may be connected with one another in a positive engagement and/or a material engagement according to another embodiment of the present invention. This embodiment provides the hub with a particularly high stability.

According to a further embodiment, the ring element is provided with a profile of virtually any shape when the sheet metal part of the ring element is constructed as a sheet metal strip with interconnected ends. In this way, the profile may be produced by an undulating or corrugated shaping of the sheet metal strip.

The ring element has a particularly high stability when the sheet metal part of the ring element is constructed as a pipe piece with indentations corresponding to the profile.

According to another embodiment, the driver further includes a sleeve which is connected at the radial inner end of the sheet metal part of the driver. The sleeve is used for fastening the driver to the shaft which contributes to increased stability of the driver. For this purpose, the sleeve may be constructed as a rotating part with high strength and particularly small dimensions.

To further increase stability of the driver, two sheet metal parts may be used that are arranged in a mirror-inverted arrangement. This construction allows the driver to be arranged in any desired manner such, for example, as with beads or in a box-shaped manner.

In yet another embodiment, the outer profile of the sheet metal part of the driver corresponds to the radial inner area of the sheet metal part of the ring element such that very high forces can be transmitted to the sheet metal part of the driver from the sheet metal part of the ring element.

A torque damper may be integrated in the hub according to the invention in a particularly economical manner when it is arranged between the sheet metal parts of the ring element and driver. In this way, the sheet metal parts of the ring element and driver, which must be manufactured separately in any case, need only be shaped in a corresponding manner in their areas facing the torque damper.

The hub with the torque damper according to the present invention has a particularly low weight when the torque damper has a housing manufactured from shaped sheet metal and when the housing has two legs which are arranged parallel to one another and which face radially inward from the ring element.

A result of this construction is that the torque damper contributes to increase-stiffness of the hub according to the invention in the area of the hub adjoining the ring element.

According to a further embodiment, the ring element is reliably held in its intended axial position when the sheet metal part of the ring element has lugs which are bent radially inward and which laterally contact the structural component part of the hub component that adjoins the ring element. The structural component part of the hub that adjoins the ring element may, for example, be the torque damper or the driver.

The hub according to yet another embodiment of the present invention has a particularly small number of structural component parts when two sheet metal parts of the driver are constructed to adjoin one another and have a collar for forming the ring element at the radial outer circumferences.

To further reduce the quantity of structural component parts of the hub according to the invention, the sheet metal parts of the driver may have, at their radial inner boundary, at least one collar provided for fastening to the shaft. The collar may be constructed to correspond to a profile of the shaft so that no intermediate sleeve is required for the connection of the hub to the shaft.

The sheet metal parts of the driver may be connected with one another in a material engagement or in a positive engagement in any desired manner. In particular, the sheet metal parts may be riveted together. According to another embodiment of the invention, additional structural component parts to be mounted for the connection and heating of the sheet metal parts caused by riveting can be avoided when the sheet metal parts of the driver have lugs which engage around one another. Accordingly, the hub according to the invention may be produced and mounted in a particularly economical manner.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 5 is a longitudinal sectional view of a hub according to another embodiment of the present invention with a torque damper;

FIG. 6 is a longitudinal sectional view of a hub according to another embodiment of the present invention with a torque damper;

DETAILED DESCRIPTION OF THE PRESENTLY PREFERRED EMBODIMENTS

Figure 1:
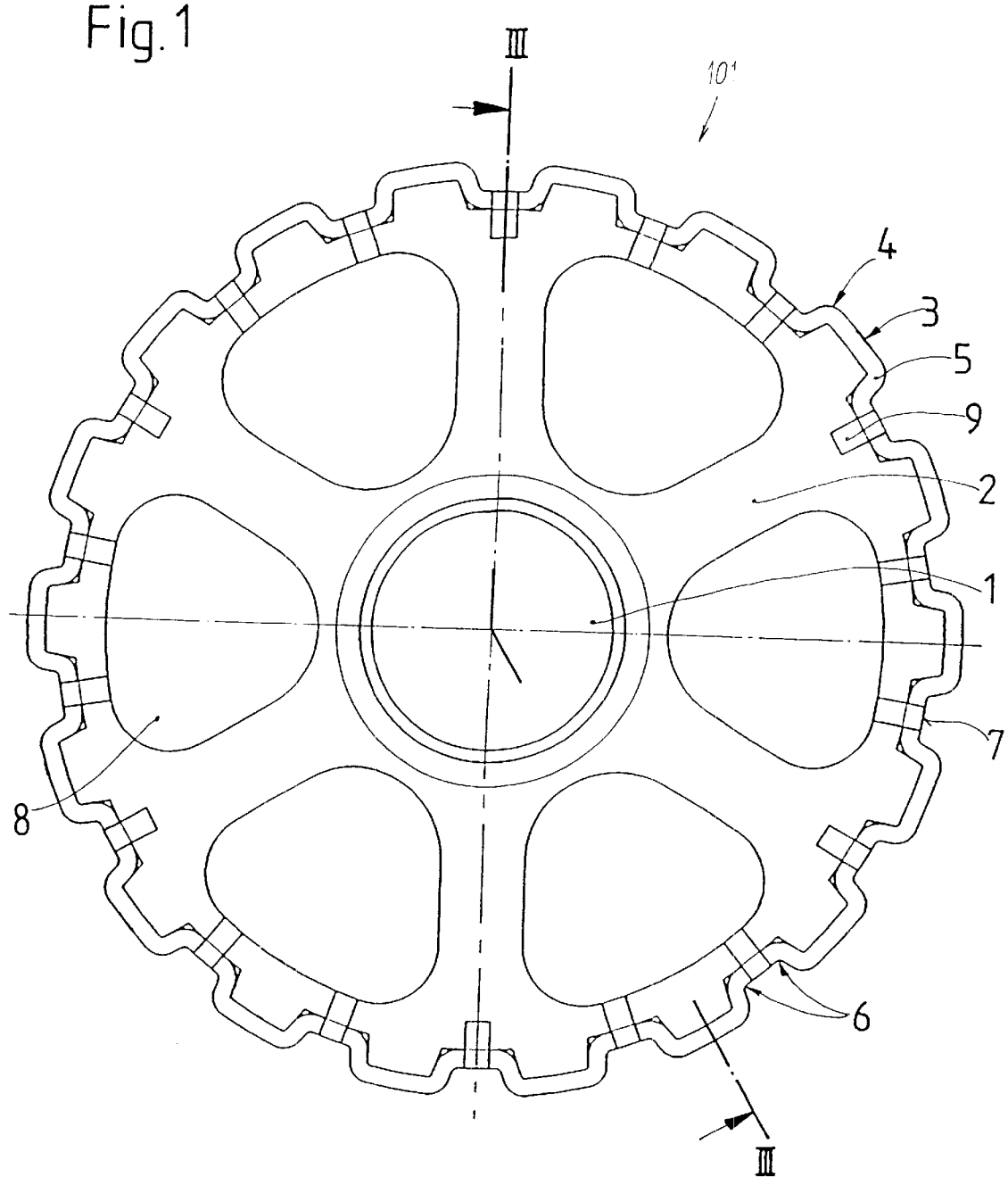
FIG. 1 is a front view of a hub according to an embodiment of the present invention.

FIG. 1 shows a hub 101 for a clutch for a motor vehicle according to an embodiment of the present invention. The hub 101 includes a driver 2 connected to a shaft 1 and a ring element 3 connected on a radial outer perimeter of the driver 2. The shaft 1 may, for example, be a transmission input shaft. The ring element 3 has a projecting profile 4 at its radial outer side. The profile 4 is formed by a sheet metal part 5 that has been shaped to have a plurality of grooves 7 formed by bends 6. The profile 4 is shaped for holding friction facings, not shown, so that the friction facings are fixed with respect to rotation and axially displaceable relative to the hub 101. The driver 2 has recesses 8 to economize on weight. The ring element 3 has lugs 9 arranged in the grooves 7 facing toward the driver 2. The radial outer area of the driver 2 has a contour corresponding to the ring element 3. Accordingly, the ring element 3 is connected with the driver 2 in a positive engagement in the tangential, i.e., rotational, direction.

Figure 2:
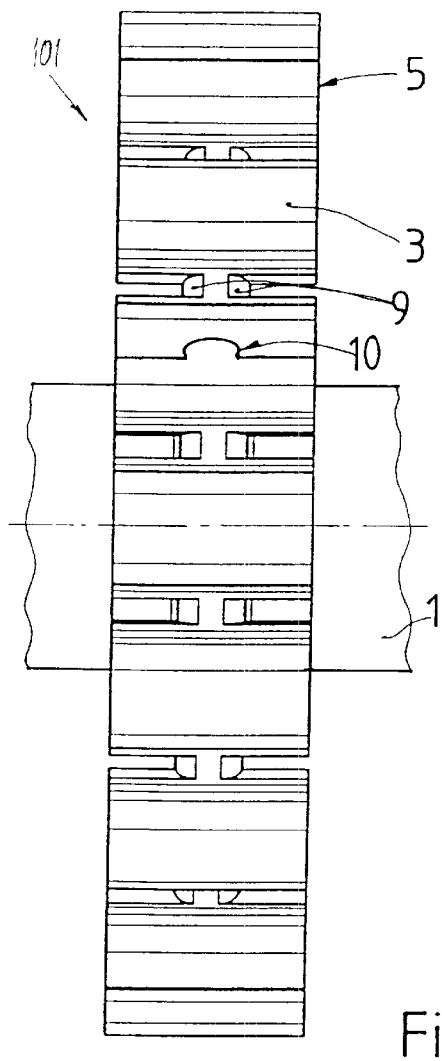
FIG. 2 is a side view of the hub of FIG. 1.

FIG. 2 shows that the sheet metal part 5 of the ring element 3 is a strip of sheet metal that is wrapped around the driver 2. The ends of the strip-shaped sheet metal part 5 forming the ring element 3 have a positive-engagement connection 10 with one another. The lugs 9 comprise an integral part of the ring element 3 and are punched out portions of the sheet metal part 5 that are bent radially inward toward the driver 2.

Figure 3:
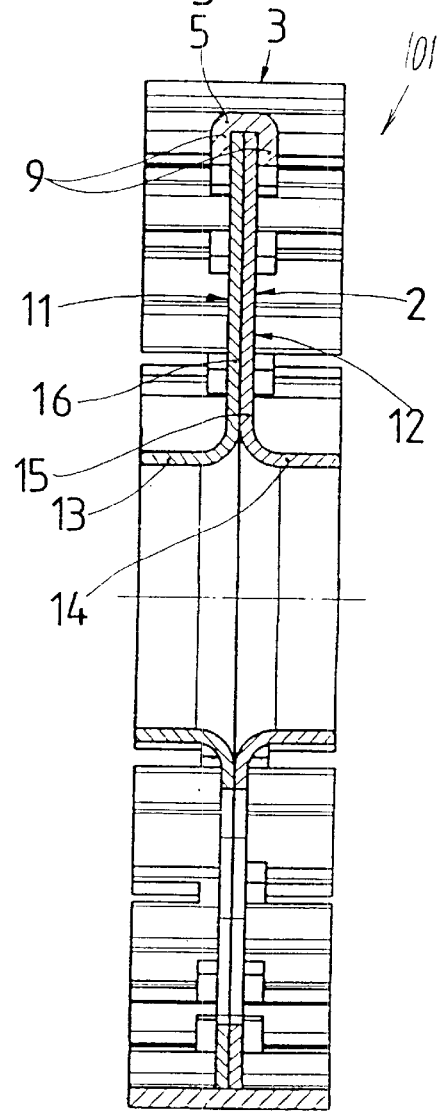
FIG. 3 is a sectional view of the hub along line III—III in FIG. 1.

In a sectional view through the hub 101 from FIG. 1 along line III—III, FIG. 3 shows that the driver 2 comprises first and second sheet metal parts 11, 12 which are arranged in a mirror-inverted arrangement and meet along a center plane of the hub 101. The first and second sheet metal parts 11, 12 respectively have first and second tubular collars 13, 14 in a radial inner area and rims 15, 16 arranged perpendicular to the first and second collars 13, 14. The rims 15, 16 of the driver 2 are guided radially from the collars 13, 14 up to the sheet metal part 5 of the ring element 3. The sheet metal parts 11, 12 of the driver 2 are clamped together at this location by the lugs 9 of the ring element 3. For the sake of simplicity, the shaft 1 from FIG. 1 is not shown in FIG. 3.

Figure 4:
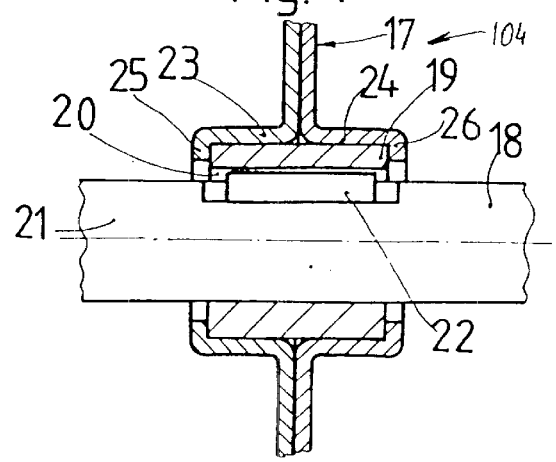
FIG. 4 is a partial longitudinal sectional view of a radial inner area of another embodiment form of the hub according to the present invention.

FIG. 4 shows a radial inner area of another embodiment form of a hub 104 according to the present invention. The hub 104 differs from the hub 101 shown in FIGS. 1 to 3 in that a driver 17 has a sleeve 19 facing radially inward from collars of sheet metal parts 23, 24 at an area of the driver 17 which adjoins a shaft 18. The sleeve 19 has a groove 20 for receiving a key or adjusting key 22 which is arranged in a groove 21 of the shaft 18. The sheet metal parts 23, 24 of the driver 17 have beads 25, 26 contacting the axial end sides of the sleeve 19. Instead of having a groove 21 with a key 22, the shaft may be constructed as a splined shaft. Furthermore, the sleeve 19 may also have an inner toothing instead of the groove 20.

FIG. 5 shows a longitudinal section through another embodiment form of the hub 105 according to the present invention comprising a torque damper 29 with a spiral coiled spring 30. The torque damper 29 is arranged between a driver 27 and a ring element 28. The ring element 28 has a sheet metal part 31 with a profile 32. In contrast to the sheet metal part 5 shown in FIG. 1, the sheet metal part 31 is constructed as a pipe piece in which the profile 32 is formed. The form of ring element 28 is similar to the ring element 3 shown in FIGS. 1 to 3. The torque damper 29 comprises a housing 33 in its radial outer area with two legs 34, 35 which face radially inward. The sheet metal part 31 of the ring element 28 has lugs 36, 37 which extend radially inward from the ring element and contact the sides of the housing 33.

A driver 27 of the hub 105 comprises a rotating part with a tubular collar 38 and a rim 39 which is arranged in the center of the tubular collar 38 and extends radially outward from the tubular collar 38. The tubular collar 38 of the driver 27 may, for example, be shrunk on a shaft for connecting the driver 27 to the shaft. The rim 39 comprises a part of the torque damper and extends between the two legs 34, 35. This embodiment form of the hub 105 according to the present invention has a high stability due to the box-shaped construction of the housing 33 of the torque damper 29.

FIG. 6 shows another embodiment form of a hub 106 according to the present invention that has a torque damper 40. The hub 106 has a sleeve-shaped driver 41 in a radial inner area and a ring element 42 with a sheet metal part 43 in a radial outer area. The driver 41 is connected to first and second radially extending legs 44, 45 of the torque damper 40. The ring element 42 is fastened to a third leg 46 of the torque damper 40 extends radially inward from the sheet metal part 43 of the ring element and is arranged between said first and second legs 44, 45. For this purpose, the sheet metal part 43 of the ring element 42 has lugs 47 which are pretensioned relative to the third leg 46. In this embodiment, the majority of the heavy structural component parts of the hub 106 are accordingly arranged closer to the radial inner area of the hub 106, thereby limiting the inertia.

Figure 7:
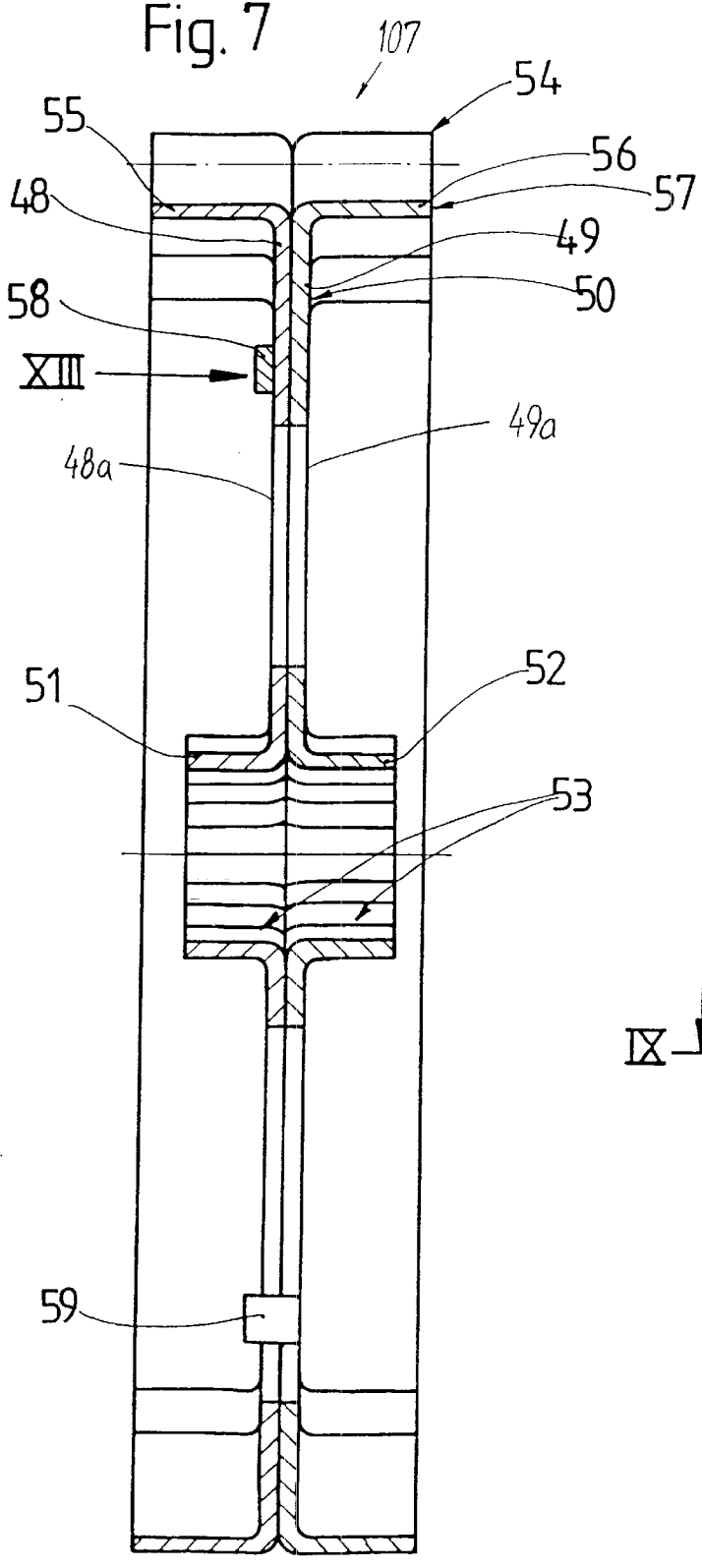
FIG. 7 is a longitudinal sectional view of another embodiment form of the hub according to the present invention.

FIG. 7 shows yet another embodiment of a hub 107 according to the present invention which is composed exclusively of first and second sheet metal parts 48, 49. The first and second sheet metal parts 48, 49 are adjoined in a radially extending area to form a driver 50 with respective collars 51, 52 arranged in a radial inner area of the driver 50. Each collar 51, 52 has a splined shaft profile 53 facing radially inward for fastening the hub 107 to a shaft, not shown, which is, for example, constructed in a corresponding manner as a splined shaft. In their radial outer areas, the first and second sheet metal parts 48, 49 respectively have radial outer collars 55, 56 which are provided with a profile 54 for forming a ring element 57. The first and second sheet metal parts 48, 49 are connected with one another in a central radial area. The second sheet metal parts 49 has lugs 58, 59 which engage around a radially extending spoke-shaped element 48a of the first sheet metal part 48.

Figure 8:
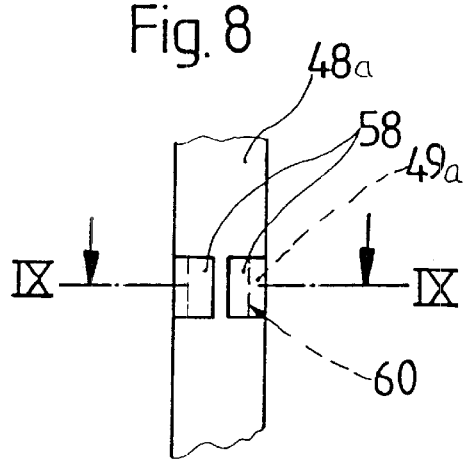
FIG. 8 is a front view of a partial area of the hub indicated by arrow XIII of FIG. 7.
Figure 9:
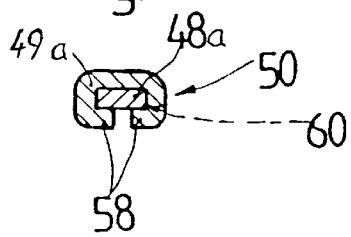
FIG. 9 is a sectional view showing the hub of FIG. 8 along line IX—IX.

In a front view of the position indicated by arrow XIII on the hub 107 in FIG. 7, FIG. 8 shows that the first and second sheet metal parts 48, 49 are respectively constructed with spoke-shaped elements 48a, 49a in their central radial area. The lugs 58 are produced integral with the spoke shaped elements 49a of the second sheet metal part 49 and engage around the spoke-shaped elements 48a of the first sheet metal part 48. FIG. 9 is a section through a central radial area of the driver 50 from FIG. 8, the spoke-shaped element 48a of the first sheet metal part 48 that is engaged by the lugs 58 has a necked-down portion 60 in this region. Since the lugs 58, 59 are an integral part of the second sheet metal part 49, this construction of the driver 50 requires fewer mounted structural component parts.

Alternatively, the first and second sheet metal parts 48, 49 may have bore holes through which rivets could pass. In this way, the sheet metal parts can be riveted together without distortion or warping.

The invention is not limited by the embodiments described above which are presented as examples only but can be modified in various ways within the scope of protection defined by the appended patent claims.

I claim:

1. A hub for a clutch having friction facings and a driven shaft, said hub comprising a plurality of structural components including:

a driver connectable to said driven shaft and having a radially outward facing surface; and a ring element arranged on said radially outward facing surface of said driver having a profile engagable with the friction facing of the clutch for receiving torque to be conducted into the driven shaft via said driver, said ring element comprising a circumferential sheet metal part shaped to form said profile, and said sheet metal part comprising areas that are bent over for connection of said sheet metal part to a neighboring one of said plurality of structural parts of said hub, wherein a shape of the bent over portion forms an engagement with said neighboring one of said plurality of structural parts and said engagement formed by said shape of said bent over portion fixedly connects said ring element to said driver.

2. The hub of claim 1, wherein said driver comprises a driver sheet metal part with a tubular collar and a rim arranged on said tubular collar and extending perpendicular to said tubular collar, said tubular collar being insertable on the driven shaft for enclosing the driven shaft.

3. The hub of claim 1, wherein said circumferential sheet metal part of said ring element comprises a pipe piece having indentations corresponding to said profile.

4. The hub of claim 1, wherein said plural structural components further comprise a sleeve arranged at an inner radial end of said driver such that said driver is connectable to the driven shaft via said sleeve.

5. The hub of claim 1, wherein said driver comprises first and second sheet metal parts arranged in a mirror-inverted arrangement.

6. The hub of claim 5, wherein said first and second sheet metal parts of said driver are constructed so as to adjoin one another and wherein said circumferential sheet metal part of said ring element comprises a collar at a radial outer end of said first and second sheet metal parts.

7. The hub of claim 5, wherein said first and second sheet metal parts of said driver comprise at least one collar arranged at a radial inner end of said first and second sheet metal part fastenable to the driven shaft.

8. The hub of claim 1, wherein said driver sheet metal part of said driver comprises an outer profile corresponding to a radial inner area of circumferential sheet metal part of said ring element, wherein said ring element is positively connected to said driver along a rotational direction.

9. The hub of claim 1, wherein said plural structural components further comprise a torque damper arranged between said ring element and said driver.

10. The hub of claim 9, wherein said torque damper comprises a housing comprising shaped sheet metal parts, said housing having an area adjacent to said ring element comprising two legs arranged parallel to one another and extending radially inward from said ring element.

11. The hub of claim 9, wherein said bent over areas of said circumferential sheet metal part of said ring element include lugs, each of said lugs comprising a portion of said circumferential sheet metal bent radially inward and laterally contacting the one of said plurality of structural components that contacts said ring element.

12. The hub of claim 11, wherein the one of said plural structural components that contacts said ring element comprises said torque damper.

13. The hub of claim 1, wherein said bent over areas of said circumferential sheet metal part of said ring element include lugs, each of said lugs comprising a portion of said circumferential sheet metal bent radially inward and laterally contacting the one of said plurality of structural components that contacts said ring element.

14. The hub of claim 13, wherein the one of said plural structural components that contacts said ring element comprises said driver.

15. A hub for a clutch having friction facings and a driven shaft, said hub comprising a plurality of structural components including:

a driver connectable to said driven shaft; and a ring element arranged on said driver having a profile engagable with the friction facing of the clutch for receiving torque to be conducted into the driven shaft via said driver, said ring element comprising a circumferential sheet metal part shaped to form said profile, and said sheet metal part comprising areas that are bent over for connection of said sheet metal part to a neighboring one of said plurality of structural parts of said hub, wherein said ring element is fixedly connected to said driver via said bent over areas of said sheet metal part, wherein said circumferential sheet metal part of said ring element comprises a sheet metal strip having connected longitudinal ends.

16. A hub for a clutch having friction facings and a driven shaft, said hub comprising a plurality of structural components including:

a driver connectable to said driven shaft and comprising first and second sheet metal parts arranged in a mirror-inverted arrangement; and a ring element arranged on said driver having a profile engagable with the friction facing of the clutch for receiving torque to be conducted into the driven shaft via said driver, said ring element comprising a circumferential sheet metal part shaped to form said profile, and said sheet metal part comprising areas that are bent over for connection of said sheet metal part to a neighboring one of said plurality of structural parts of said hub, wherein said ring element is fixedly connected to said driver via said bent over areas of said sheet metal part, wherein said first and second sheet metal parts comprise spoke-like regions with spoke-shaped elements at a center radial portion of said driver, wherein said spoke-like region of said second sheet metal part comprises lugs which engage around said spoke-like region of said first sheet metal part.

* * * * *